Oct. 29, 1940.   K. MARGGRAF   2,219,998
GYROSCOPE
Filed Oct. 12, 1938
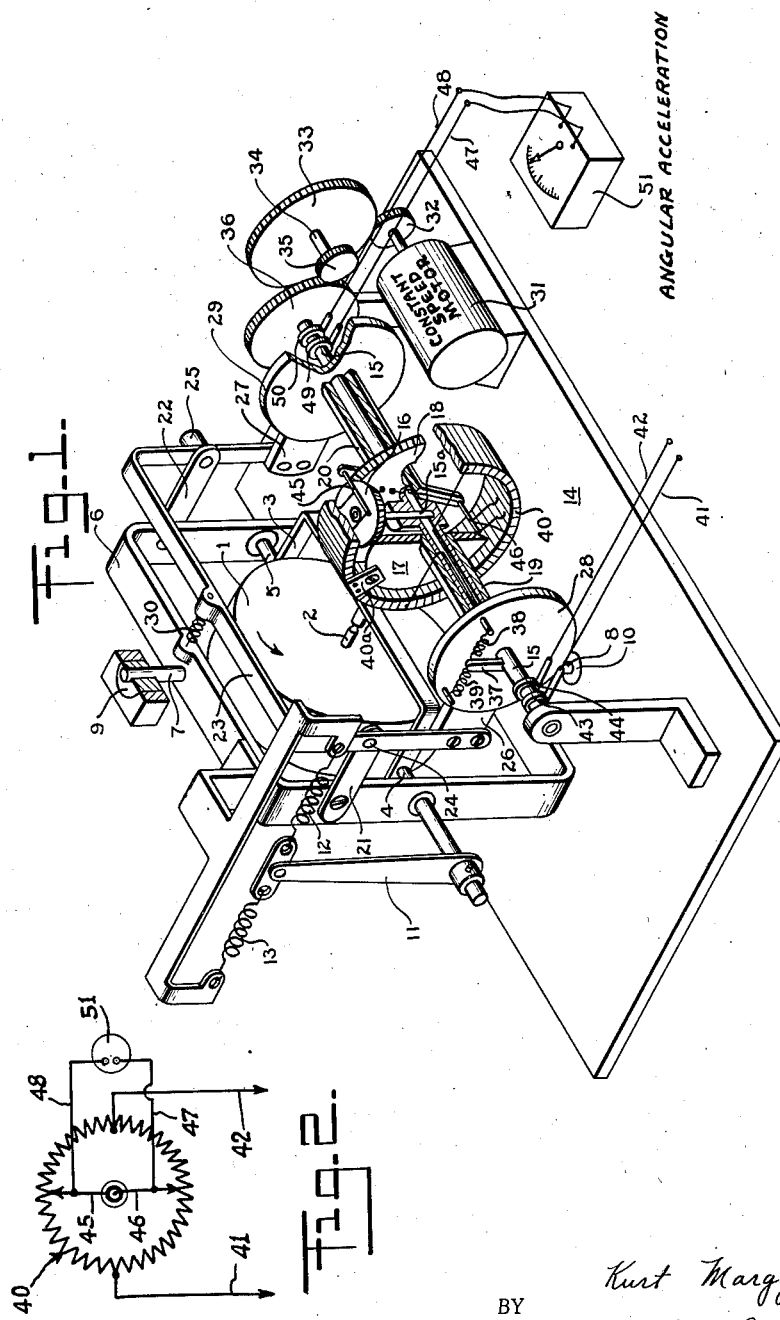
INVENTOR.
Kurt Marggraf.
BY Stephen Cerstvik
ATTORNEY.

Patented Oct. 29, 1940

2,219,998

UNITED STATES PATENT OFFICE 2,219,998

GYROSCOPE

Kurt Marggraf, Berlin-Pankow, Germany, assignor to Siemens Apparate und Maschinen Gesellschaft mit beschrankter Haftung, Berlin, Germany, a corporation of Germany Application October 12, 1938, Serial No. 234,689
In Germany June 4, 1937

8 Claims. (Cl. 33—204)

This invention relates to gyroscopes, and more particularly to gyroscopic devices for measuring changes in angular velocity.

One of the objects of the present invention is to provide novel means for measuring the angular acceleration of a vehicle, such as an aeroplane, about a predetermined axis.

A further object of the invention is to provide a novel apparatus of the above character for measuring a moment tending to precess a gyroscope, the moment being caused by a change of angular speed of a vehicle upon which the gyroscope is mounted.

Another object is to provide novel means for controlling a differential drive in response to a moment tending to precess a gyroscope.

An additional object is to provide novel means for indicating a change in angular velocity of an air craft, which means may be employed in combination with automatic control means to govern the velocity of the aircraft.

A still further object is to provide a novel apparatus of the above character for measuring a moment tending to precess a gyroscope, which apparatus is responsive to minute angular changes in the position of the mounting of said gyroscope.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had to the appended claims.

Fig. 1 is a perspective view, with parts broken away, of one embodiment of the invention.

Fig. 2 is a wiring diagram of the electric bridge circuit.

In the form shown, the means for producing an acceleration responsive impulse or moment is constituted by a gyroscope having a rotor 1 and a rotor shaft 2 which is mounted in an inner gimbal frame 3. The latter in turn is mounted by means of trunnions 4, 5 in an outer gimbal frame 6 which is provided with trunnions 7, 8 which rest in suitable bearings 9, 10. Trunnions 7, 8 are preferably parallel to the aircraft's vertical axis.

In order to retain the plane of rotation of the gyroscope in a predetermined position to insure a proper precession, suitable restricting means are provided for the inner gimbal trunnion 4, comprising, in the form shown, an arm 11, one extremity of which is rigidly attached to said trunnion. The opposite arm extremity is resiliently held in position, by means of opposed springs 12, 13, so that the plane of rotation of rotor 1 contains the axis of trunnions 7, 8.

Novel means are provided for measuring the moment which is a result of the acceleration of the craft upon which the apparatus is mounted, the acceleration occurring about the craft's vertical axis, i. e., the axis of trunnions 7, 8 comprising a differential arrangement 14 which is constituted by a planetary shaft 15 having a planetary gear 16 rotatably mounted upon a shaft 15a, the latter being perpendicularly secured to shaft 15. Planetary gear 16 meshes with conventional sun gears 17 and 18 mounted upon input or sleeve shafts 19 and 20, respectively. The latter two shafts surround shaft 15 and are located upon either side of the planetary gear.

A frictional engagement is obtained between the two sun gears 17, 18 and the gimbal frame 6 by means of a brake arrangement which is constituted by a pair of arms 21, 22 which are rigidly attached to frame 6 and which pivotally support a yoke 23 by means of pins 24, 25, respectively. The free extremities of yoke 23 have secured thereto brake shoes 26, 27 which frictionally engage the periphery of discs 28, 29 which are rigidly attached to sleeve shafts 19 and 20, respectively. A suitable draw spring or resilient member 30 is interposed between frame 6 and yoke 23 in order to yieldingly urge shoes 26, 27 against discs 28, 29. The spring should be so dimensioned that it is not stretched by the greatest of the turning moments which tend to move frame 6. Each of the two brake shoes, under the action of said draw spring, engages one of the discs in such a manner that the pressure of the two shoes against the discs, in the control or zero position, is greater than the greatest pressure therebetween as caused by a precessional moment of the gyroscope tending to rotate frame 6, the moment being due to the above mentioned angular acceleration.

The planetary shaft 15 is rotated at a constant speed by means of an electric motor 31 which is operatively connected thereto by a reduction gear arrangement comprising a gear 32, upon the motor, which meshes with a gear 33 upon a shaft 34. Another gear 35 upon said shaft meshes with a gear 36 which is mounted upon the spider shaft.

In order that all the members of the differential gear may rotate as a unit and in the same angular relation to one another until a relative angular change, i. e., a change in the phase relation of said members, is produced by a difference in the frictional engagement of shoes 26, 27 with discs 28, 29, the planetary shaft 15 is resiliently connected to disc 28 by means of an arm 37, which is perpendicularly secured upon said shaft. The free extremity of arm 37 is held between two opposed springs 38, 39 which are secured to the disc. "Phase relation" as herein used means the relation of sun gears 17 and 18 to each other when the pressure on discs 28 and 29 is equal and the bridge circuit is balanced. "Change in phase relation" is applied to the relationship, during angular acceleration, of sun gears 17 and 18 when the pressure on the discs is unbalanced and current flow occurs in the ammeter 51.

Suitable means are provided for indicating a change in the phase relation of the two sun gears 17, 18 comprising, in the form shown, a bridge which is constituted by a ring resistance 40 which surrounds and is rigidly secured to gear 17 by means of interconnecting links 40a. Ring 40 is thus adapted for rotation with gear 17. Resistance 40 is fed through leads 41, 42 which are in communication therewith by means of slip rings 43, 44 respectively.

Two contacts slidably engage the inner surface of ring 40 comprising movable bridge arms 45, 46 which are each rigidly connected to sun gear 18 and which are respectively connected to leads 47, 48 by means of slip rings 49, 50 and thence connected to an electric measuring apparatus, for example an ammeter 51, having a scale calibrated in units of angular acceleration.

In operation, motor 31, which is connected to a suitable source of electric energy (not shown), rotates the planetary shaft 15 at a constant angular velocity. The planetary shaft, being resiliently connected to disc 28, causes the entire differential to rotate as a unit.

When the craft upon which the apparatus is mounted moves in a curved path with a constant angular velocity about an axis parallel to that of the trunnions 7, 8 the gyro tends to precess about axis 4, 5. This action takes place because in a turn indicator gyro the spinning axis of the gyro will tend to assume a parallel relation to that of the axis of the turn. Once the turn is completed the springs 12 and 13 will cause the gyro to assume its original position as shown in Fig. 1. Before the plane can reach a constant angular velocity while making a turn, angular acceleration must occur before such position is reached. It is the angular acceleration which continually calls upon the springs 12 and 13 to act so that while increasing tension continues in the latter, a reactive force is set up on the precession axis in the form of bearing pressure, and this force rotates the gimbal 6 about its axis 7, 8. Such movement of the gimbal 6 carries the yoke 23 and brakes the disc 28 or 29 dependent upon clockwise or counter-clockwise rotation of the gyro rotor.

When constant angular velocity is maintained, the gimbal 6 remains in a predetermined position causing equal braking pressure upon discs 28 and 29. In this condition, the sun gears 17, 18 rotate at an equal rate of speed so that the arms 45, 46 are centrally disposed upon the bridge 40 maintaining the latter in a balanced condition. No current then flows through the ammeter under this condition which indicates zero acceleration.

The torque created by the constant angular velocity of the plane results in a tendency of the gyro to precess about the axis 4, 5. This tendency is absorbed by the springs 12 and 13, and since the force does not manifest itself in the form of a bearing pressure in the bearings of the precession shaft, no consequent variation of pressure occurs between the brake members 26 and 27 and the discs 28 and 29.

Upon acceleration of the plane, variation of the precessional tendency occurs, the variation of the latter being proportional to the rate of change of speed. Angular acceleration creates a pressure on the precessional shaft in its bearings and the turning moment created by such pressure acts about the axis 7, 8. Rotation of the gimbal 6 is effected about its vertical axis causing variation of pressure through yoke 23 carrying brake members 26 and 27 upon the discs 28 and 29. This pressure variation is transferred to the differential arrangement causing unbalancing of the bridge shown in Fig. 2 and thereby indicating rate of change of speed upon the ammeter 51.

The bridge circuit is shown in Fig. 2 in its normal zero position when no acceleration occurs. As soon as acceleration is effected, due to the braking of elements 28 or 29, lag of either sun gear 17 or 18 occurs and thereby unbalances the circuit to give a reading of the angular acceleration. When constant velocity is maintained, the braking pressure is equalized and the bridge 40 and contacts 46 and 45 assume the normal position of Fig. 2 to give a zero acceleration reading.

There is thus provided a novel gyroscopic arrangement which is adapted for use aboard aircraft in determining the angular acceleration of the craft about one of the axes thereof. The apparatus is positive and sensitive in operation and requires but a small amount of space, and furthermore may be operatively connected without difficulty to suitable automatic control means for governing the speed or attitude of the craft.

Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. In apparatus of the class having a gyroscope in a gimbal ring mounting, means for resiliently constraining said gyroscope to rotate in a plane containing the axes of said gimbal ring mounting, the combination with said gyroscope of a differential, the latter having a differential planet shaft, a first sun gear, and a second sun gear, a planet gear on said shaft meshing with said sun gears, means for resiliently interconnecting said planet shaft and one of said sun gears, means for rotating said planet shaft at constant speed, frictional restraining means for said first sun gear, frictional restraining means for said second sun gear, said frictional restraining means being operatively connected to said gimbal ring mounting, and means for indicating an angular relative change of position of said sun gears.

2. The combination with a gyroscope having a gimbal ring mounting comprising an inner frame, an outer frame, means for rotatably mounting said inner frame within said outer frame, and trunnions for said outer frame, mounting said frame for rotation about an axis at right angles to said inner frame axis, of means for resiliently retaining the gyroscopic plane of rotation in parallel relation to the axis of the trunnions for said outer frame, a differential having a planetary shaft, means constantly rotating said shaft, a first input shaft, a second input shaft, said input shafts being sleeved about said planetary shaft, a friction disc for the first input shaft, a friction disc for the second input shaft, means for resiliently interconnecting one of said input shafts to said planetary shaft, means for frictionally engaging the first-named friction disc, means for frictionally engaging the second-named friction disc, said two last-named means being attached to said outer frame at opposite sides thereof in a direction parallel to said inner frame axis.

3. Gyroscopic apparatus for indicating the angular acceleration of an aircraft and the like about an axis, comprising a support fixed to said craft, a gimbal ring pivoted on said support for limited rotation about a second axis parallel to or coincident with the first-named axis, a gyroscope mounted in said ring for spinning about a third axis perpendicular to said first and second axes and for precession about a fourth axis mutually perpendicular to said first and third axes, yielding means opposing precession of said gyroscope about said fourth axis whereby a torque is produced on said gyroscope about said fourth axis during angular acceleration of the aircraft about said first axis which causes said gyroscope to rotate in precession about said second axis, differential drive means including a balanced bridge circuit, and means comprising friction means actuated by the tendency of the gyro to precess about said second axis and connected with said gimbal ring and engaging respectively separate parts of said differential drive means to differentially vary the pressure between each friction means and its part, thus unbalancing said bridge circuit and causing current flow therein in accordance with the angular acceleration of said craft.

4. Gyroscopic apparatus for indicating the angular acceleration of an aircraft and the like about an axis, comprising a support fixed to said craft, a gimbal ring pivoted on said support for limited rotation about a second axis parallel to or coincident with the first-named axis, a gyroscope mounted in said ring for spinning about a third axis perpendicular to said first and second axes and for precession about a fourth axis mutually perpendicular to said first and third axes, yielding means opposing precession of said gyroscope about said fourth axis whereby a torque is produced on said gyroscope about said fourth axis which causes said gyroscope to rotate in precession about said second axis, differential means having a pair of sun gears provided with frictionally engageable surfaces operatively connected to each of said gears, means for frictionally engaging said surfaces actuated by the tendency of the gyro to precess about said second axis and connected with said gimbal ring to differentially vary the pressure upon said surfaces thereby producing relative rotation of said sun gears, and means for indicating a change in the relative relation of said gears as a function of the angular acceleration of said craft.

5. Gyroscopic apparatus for indicating the angular acceleration of an aircraft and the like about an axis, comprising a support fixed to said craft, a gimbal frame pivoted on said support for limited rotation about a second axis parallel to or coincident with the first-named axis, a gyroscope mounted in said frame for spinning about a third axis perpendicular to said first and second axes and for precession about a fourth axis mutually perpendicular to said first and third axes, resilient means for opposing precession of said gyroscope about said fourth axis whereby a torque is produced on said gyroscope about said fourth axis which causes said gyroscope to rotate in precession about said second axis, a yoke pivotally mounted upon said gimbal frame and being adapted for movement therewith, a differential mechanism having operative members thereof provided with frictionally engageable surfaces operatively connected with said members, means for frictionally engaging said surfaces being mounted upon said yoke and actuated by the tendency of the gyro to precess about said second axis to differentially vary the pressure upon said surfaces, thereby producing relative movement of said members, and means for indicating a change in the relative disposition of said members as a function of the angular acceleration of said craft.

6. Gyroscopic apparatus for indicating the angular acceleration of an aircraft and the like about an axis, comprising a support fixed to said craft, a gimbal frame pivoted on said support for limited rotation about a second axis parallel to or coincident with the first-named axis, a gyroscope mounted in said frame for spinning about a third axis perpendicular to said first and second axes and for precession about a fourth axis mutually perpendicular to said first and third axes, yielding means opposing precession of said gyroscope about said fourth axis whereby a torque is produced on said gyroscope about said fourth axis during angular acceleration of the aircraft about said first axis which causes said gyroscope to rotate in precession about said second axis, a yoke member yieldably secured to said gimbal frame for rotation therewith, means comprising a differential drive mechanism including a balanced bridge circuit, means comprising friction means actuated by the tendency of the gyro to precess about said second axis and connected with said yoke member and engaging respectively separate parts of said differential drive mechanism to differentially vary the pressure between each friction means and its part, thus unbalancing said bridge circuit and causing current flow therein in accordance with the angular acceleration of said craft.

7. Gyroscopic apparatus for indicating the angular acceleration of an aircraft and the like about an axis, comprising a support fixed to said craft, a gimbal ring pivoted on said support for limited rotation about a second axis parallel to or coincident with the first-named axis, a gyroscope mounted in said ring for spinning about a third axis perpendicular to said first and second axes and for precession about a fourth axis mutually perpendicular to said first and third axes, resilient means opposing precession of said gyroscope about said fourth axis whereby a torque is produced on said gyroscope about said fourth axis during angular acceleration of the craft about said first axis which causes said gyroscope to rotate in precession about said second axis, a differential having a planetary shaft provided with gear means, means constantly rotating said shaft and said gear means, a pair of differentially connected shafts for said differential, gears comprising a portion of said differential for each of said shafts and meshing with said gear means, means connected with said gimbal ring for frictionally restraining said differential shafts and their respective gears, and means independent of the precession of said gyroscope for restraining said differential shafts equally.

8. Gyroscopic apparatus for indicating the angular acceleration of an aircraft and the like about an axis, comprising a support fixed to said craft, a gimbal ring pivoted on said support for limited rotation about a second axis parallel to or coincident with the first-named axis, a gyroscope mounted in said ring for spinning about a third axis perpendicular to said first and second axes and for precession about a fourth axis mutually perpendicular to said first and third axes, yielding means opposing precession of said gyroscope about said fourth axis whereby a torque is produced on said gyroscope about said fourth axis during angular acceleration of the craft about said first axis which causes said gyroscope to rotate in precession about said second axis, a differential having a planetary shaft provided with gear means, means constantly rotating said shaft and said gear means, a pair of input shafts for said differential, gears constituting a portion of said differential for each of said input shafts and meshing with said gear means, friction discs for each of said input shafts, means for resiliently interconnecting one of said input shafts to said planetary shaft, and means carried by said gimbal ring for frictionally engaging said friction discs.

KURT MARGGRAF.